(12) United States Patent
Kochan, Jr. et al.

(10) Patent No.: US 8,979,503 B2
(45) Date of Patent: Mar. 17, 2015

(54) STRAIN GAUGE PUMP CONTROL SWITCH

(71) Applicant: Metropolitan Industries, Inc., Romeoville, IL (US)

(72) Inventors: John R. Kochan, Jr., Naperville, IL (US); Casey Barker, Plainfield, IL (US)

(73) Assignee: Metropolitan Industries, Inc., Romeoville, IL (US)

( * ) Notice: Subject to any disclaimer, the term of this patent is extended or adjusted under 35 U.S.C. 154(b) by 0 days.

(21) Appl. No.: 13/955,924

(22) Filed: Jul. 31, 2013

(65) Prior Publication Data

US 2014/0037464 A1 Feb. 6, 2014

Related U.S. Application Data

(63) Continuation of application No. 12/123,850, filed on May 20, 2008, now Pat. No. 8,591,198.

(60) Provisional application No. 60/939,453, filed on May 22, 2007.

(51) Int. Cl.
*F04B 49/00* (2006.01)
*G01F 23/14* (2006.01)
*G01F 23/18* (2006.01)
*F04B 49/06* (2006.01)

(52) U.S. Cl.
CPC .............. *G01F 23/14* (2013.01); *G01F 23/18* (2013.01); *F04B 49/06* (2013.01)
USPC ............ 417/38; 200/81 R; 200/83 R; 72/720; 72/168

(58) Field of Classification Search
USPC .............. 417/36, 38, 44.2, 44.4, 44.9, 423.3; 200/81 R, 83 R; 73/720, 726, 168
See application file for complete search history.

(56) References Cited

U.S. PATENT DOCUMENTS

| | | | | |
|---|---|---|---|---|
| 3,234,881 A | * | 2/1966 | Ekey | 417/38 |
| 3,307,000 A | * | 2/1967 | Ekey | 200/83 Y |
| 3,461,416 A | * | 8/1969 | Kaufman | 338/4 |
| 3,724,274 A | * | 4/1973 | Millar | 73/726 |
| 4,385,525 A | * | 5/1983 | Phillips et al. | 73/720 |
| 4,754,108 A | * | 6/1988 | Akhter | 200/84 R |
| 4,845,322 A | * | 7/1989 | Iwakiri et al. | 200/81 R |
| 5,672,050 A | * | 9/1997 | Webber et al. | 417/18 |
| 5,815,079 A | * | 9/1998 | Getman et al. | 340/620 |
| 6,867,383 B1 | * | 3/2005 | Currier | 200/83 R |
| 7,307,538 B2 | * | 12/2007 | Kochan, Jr. | 340/618 |
| 2002/0093306 A1 | * | 7/2002 | Johnson et al. | 318/782 |
| 2003/0107509 A1 | * | 6/2003 | Drossel | 341/155 |
| 2004/0009075 A1 | * | 1/2004 | Meza et al. | 417/32 |
| 2006/0042394 A1 | * | 3/2006 | Kosh et al. | 73/753 |
| 2008/0229819 A1 | * | 9/2008 | Mayleben et al. | 73/304 C |

* cited by examiner

*Primary Examiner* — Devon Kramer
*Assistant Examiner* — Thomas Fink
(74) *Attorney, Agent, or Firm* — Husch Blackwell LLP

(57) ABSTRACT

A control switch incorporates a solid state transducer, a strain gauge. The transducer responds to a local environmental condition, such as fluid level, or pressure and exhibits a parameter change which can be detected as an electrical output. Control circuits coupled to the transducer can sense the parameter change and switch a source of electrical energy to a load in response thereto.

11 Claims, 4 Drawing Sheets

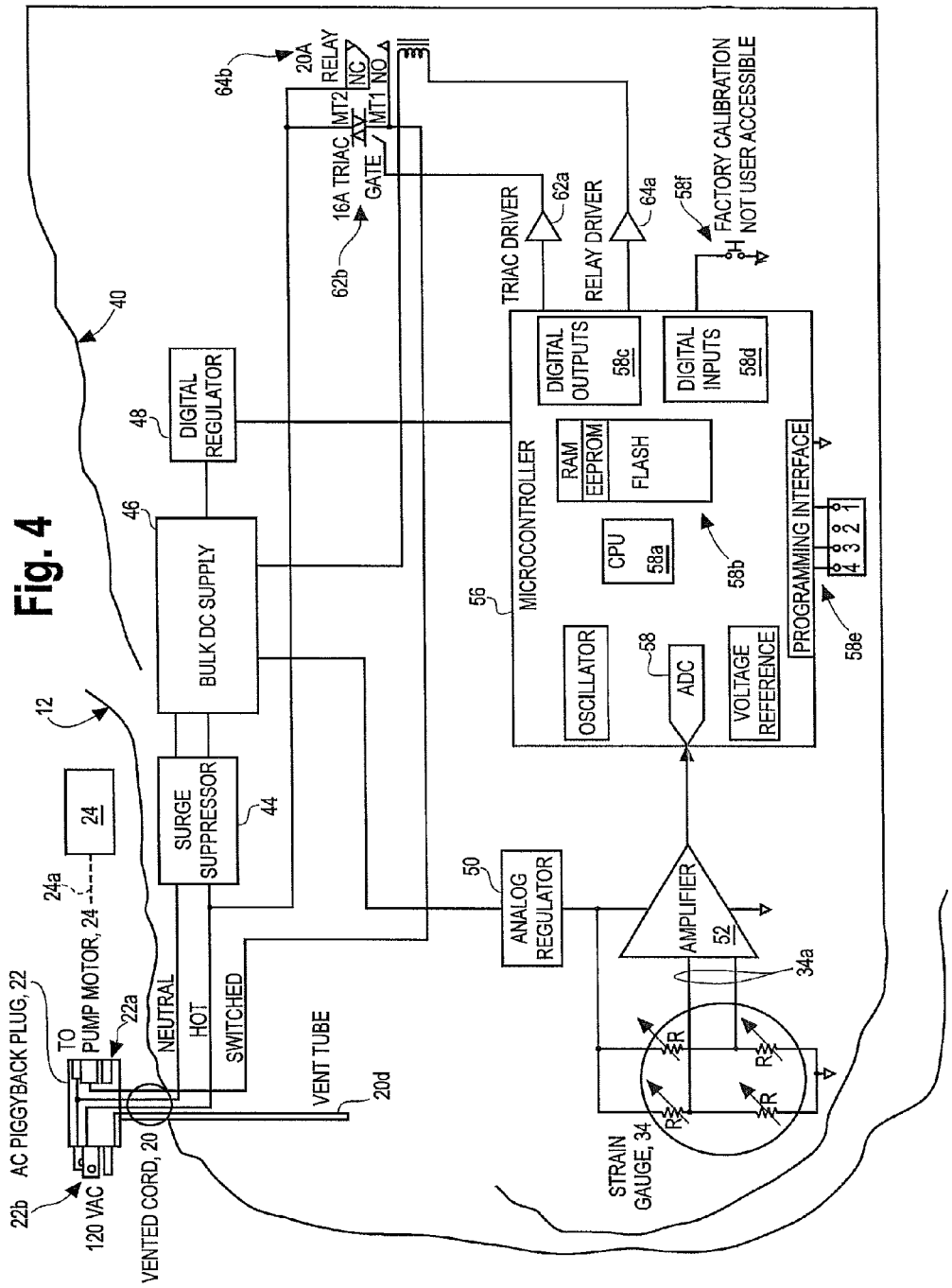

STRAIN GAUGE PUMP CONTROL SWITCH

CROSS-REFERENCE TO RELATED APPLICATION

This application is a continuation of U.S. patent application Ser. No. 12/123,850 filed May 20, 2008 and entitled "Strain Gauge Pump Switch" which claims the benefit of the filing date of U.S. Provisional Application Ser. No. 60/939,453 filed May 22, 2007 and entitled "Strain Gauge Pump Switch". The disclosures of these applications are fully incorporated herein by reference.

FIELD

The invention pertains to solid state pump control switches. More particularly, the invention pertains to such switches which incorporate a strain gauge as a transducer to convert an environment condition, such as a level of a fluid, to an electrical signal.

BACKGROUND

Various types of switches have been developed for use in turning pumps on and off in response to an external ambient condition, such as water level. Such switches tend to be used in relative harsh environments such as in tanks of water, or, sump pits which are used to collect foundation water. Other environments include industrial fluids which might be caustic or acidic, as well as high or low temperatures.

While known switches can be useful and function properly over a period of time, they are always subject to failure. Switch failures in turn translate into non-running pumps which can result in flooded commercial, industrial and residential locations. Alternately, non-running pumps can result in water supply deficiencies, or failures to supply commercial or industrial fluids for various applications.

One switch configuration has been disclosed in U.S. Pat. No. 7,307,538, issued Dec. 11, 2007, and entitled "Pump Connector System". The '538 patent is assigned to the assignee hereof and is incorporated herein by reference.

There is an on-going need for control switches usable in such environments which exhibit greater reliability and longer lifetimes than do known switches. Preferably, such improved switches would be price competitive with known switches and readily substitutable therefore.

BRIEF DESCRIPTION OF THE DRAWINGS

FIG. 4 is a block diagram of control circuits in accordance with an embodiment of the invention.

DETAILED DESCRIPTION

Figure 1:
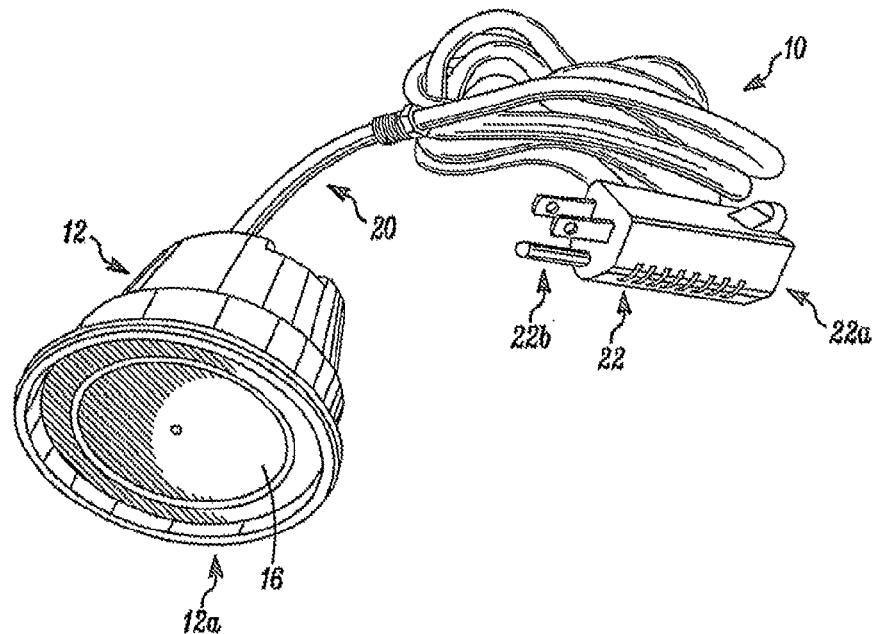
FIG. 1 is a diagram of a switch assemblage in accordance with the invention.
Figure 2:
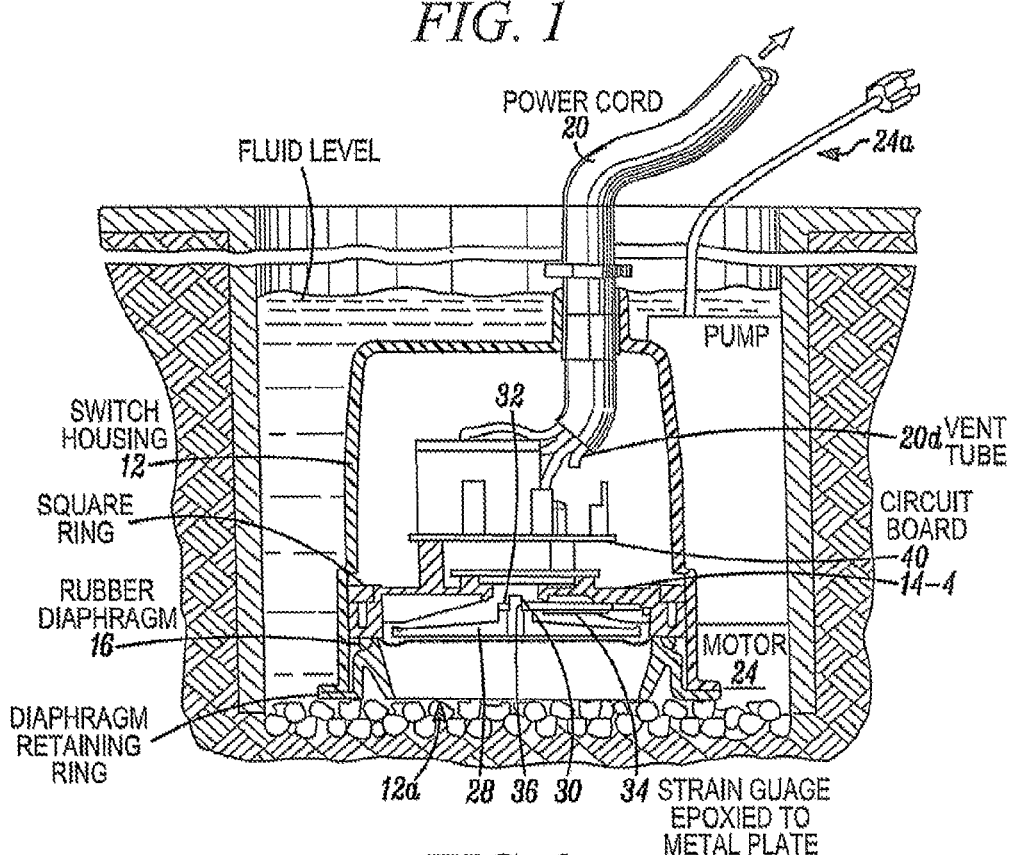
FIG. 2 is a side sectional view of an exemplary switch housing as in FIG. 1.
Figure 3:
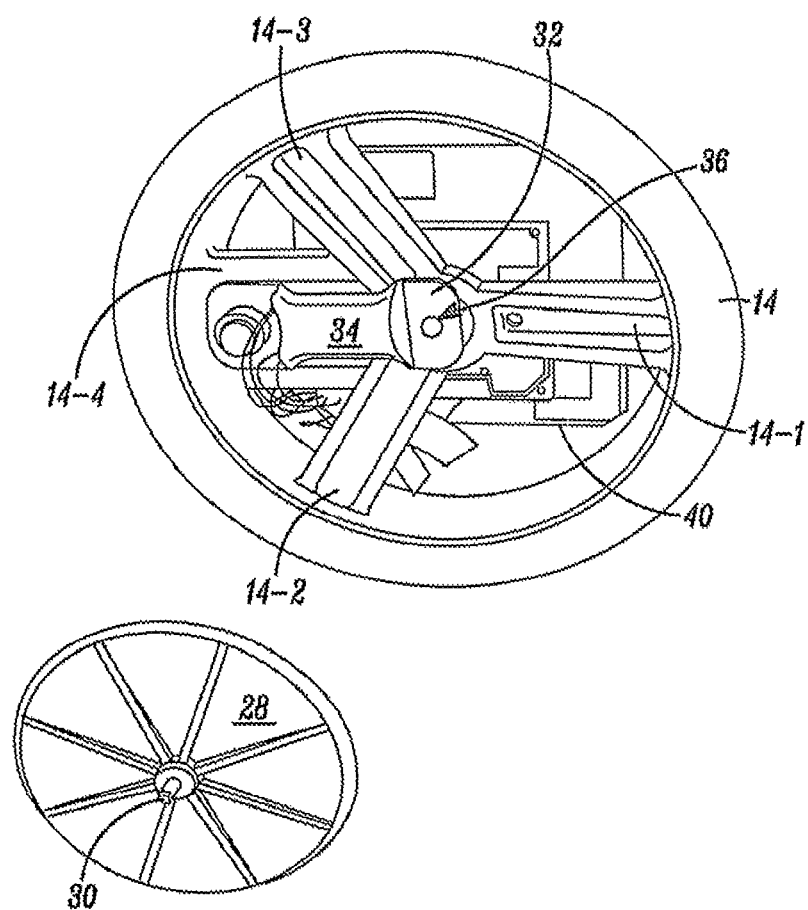
FIG. 3 is an end view of an embodiment of a transducer in accordance with the invention.

While embodiments of this invention can take many different forms, specific embodiments thereof are shown in the drawings and will be described herein in detail with the understanding that the present disclosure is to be considered as an exemplification of the principles of the invention, as well as the best mode of practicing same, and is not intended to limit the invention to the specific embodiment illustrated.

Embodiments of the invention incorporate a strain gauge as a transducer to sense the presence of a fluid either through displacement, buoyancy of a structure or by fluid pressure deforming a strain gauge platform. Such embodiments can be implemented as solid state structures which can be digitally calibrated for various settings or pressure.

In one aspect of the invention, such transducers can be coupled to electronic control and switching circuitry which can switch electrical energy to activate a load, such as an electric motor for a pump. Advantageously, motor starting inrush currents are diverted away from the transducers in such embodiments. Further, such transducers can accurately respond to changing conditions, such as level or pressure, resist vibration and can withstand harsh operating environments.

The control and switching circuitry can include relatively high power semiconductor switches which are controlled by one or more programmable processors which in turn are coupled to one or more solid state transducers, preferable strain gauges. The processor(s) can digitally calibrate one or more strain gauges.

In another aspect of the invention, a solid state switch, such as a triac, can be coupled in parallel with a relay to a pump motor connector. The switch and relay can be independently controlled by control circuits in the unit. In response to signals from the strain gauge, the control circuits can bias the switch to a low impedance state to couple electrical energy to the pump connector. In this state, the switch can couple the motor start up, inrush, current without arcing or the like to the pump connector to start the motor. Once the inrush currents have subsided, for example after a time interval such as two or three seconds, the control circuits can activate the relay which changes state and provides a closed contact pair to carry the motor current as an alternate to the solid state switch. The relay contacts shunt the motor current away from the switch enabling it to cool off as needed.

When the strain gauge indicates that the lower water level has been reached, the control circuits de-energize, turn off, the relay which open circuits the motor current circuit through those contacts. Subsequently, after another time interval, such as two or three seconds, the solid state switch is biased off, or placed in a high impedance state by the control circuits. When the switch turns off it, and not the relay contacts, absorbs any turn off current or voltage transients which might otherwise cause arcing at the relay contacts. Those contacts are thus protected from electro-ablation, contact burning.

With respect to FIGS. 1-4, a pump control system 10 includes a water tight housing 12 with an open end 12a closed by a diaphragm 16. A ring 14 is located in the housing 12 between the diaphragm 16 and a circuit board 40. Housing 12 is placed in the sump along with a pump having a motor 24 to be switched on and off.

Figure 4A:
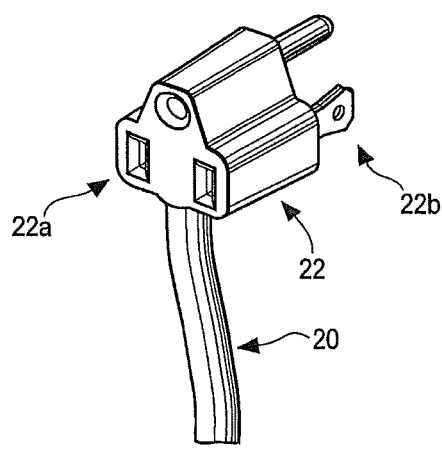
FIG. 4A is a perspective view of an electrical cable and AC connector in accordance with the invention.

An electrical cable 20 couples housing 12 to a double sided AC connector 22. As shown in FIG. 4A, connector 22 carries a pump AC receptacle 22a at one end and AC outlet prongs 22b at the other end. In operation, a pump AC connector is plugged into receptacle 22a. Prongs 22b are plugged into a local utility supplied AC outlet.

The ring assembly 14 has an annular shape with molded radial members 14-1, -2, -3, and -4. Radial member 14-4 carries an elongated, deflectable, metal plate 32 which supports a strain gauge 34. A pressure sensing plate 28 carries a connector prong 30. A centered perforation 36 in a free end of plate 32 receives the connector prong 30 with a friction fit and supports pressure plate 28 for axial motion in response to applied fluid pressure.

A printed circuit board 40 carries sensing and control circuits 42. Surge suppressing circuits 44 are coupled to a DC supply 46. A digital circuit regulator 48 and analog circuit regulator 50 feed digital circuits 56 and differential amplifier 52 respectively.

The differential amplifier 52 is coupled to strain gauge 34 via connectors 34*a*. Movement of the plate 28 in a first direction in response to increasing fluid pressure generates a signal of a first polarity at amplifier 52. Movement of plate 28 in the opposite direction, in response to decreasing fluid pressure generates a signal of the opposite polarity at amplifier 52.

Digital control circuits 56 include a programmable processor or computer 58*a*, and associated storage, random access memory, EEPROM and Flash memory indicated generally at 58*b*. Software, or, control programs stored in EEPROM or Flash memory can be executed by processor 58*a* in carrying out the above described switching process.

Circuits 56 can be accessed via a programming interface 58*e*. A factory calibration port 58*f* is also provided.

Digital output circuits 58*c* are respectively coupled to Triac driver 62*a* and Triac 62*b*, and relay driver 64*a* and relay 64*b*. As described above, electrical energy from connector 22 is switched by Triac 62*b* and relay 64*b* to provide a switched AC output 20*c* which can be coupled to pump motor 24 via pump receptacle end 22*a*.

A vent tube 20*d* extends from within housing 12, via cable 20 and terminates at connector 22. Tube 20*d* maintains pressure in the housing 12 at local atmospheric pressure.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

The invention claimed is:

1. A submersible assemblage comprising:
   an electrical cable having first and second ends;
   an electrical connector attached to the first end;
   a cylindrical housing attached to the second end of the cable, the housing having an open end displaced from the second end of the cable, the housing defines an interior region;
   a ring carried in the interior region of the housing, the ring having an annular shape, and a molded radial member which extends inwardly from the annular ring, the member carries an elongated, radially extending strain gauge-type transducer structure, the structure having a free end with a centered opening;
   a movable pressure plate that slidably engages the opening and is axially movable, relative to the ring, in response to applied fluid pressure;
   a diaphragm located adjacent to the pressure plate, the diaphragm closes the open end of the housing whereby the housing is water tight, and wherein the housing defines an exterior annular support surface wherein the ring carries control circuitry, coupled to the transducer to produce a first signal when the pressure plate moves in one direction, relative to the ring and a different signal when the pressure plate moves in the opposite direction relative to the ring.

2. An assemblage as in claim 1 which includes a power supply coupled to the transducer and carried in the housing.

3. An assemblage as in claim 1 where the switch assembly includes switching circuitry coupled to the second end and to the transducer.

4. An assemblage as in claim 3 where the switching circuitry includes a solid state switch to provide a closed electrical circuit, responsive to the transducer, that extends from the first end to the second end and then back to the first end.

5. An assemblage as in claim 4 where the connector includes a housing which carries an electrical plug and an electrical socket.

6. An assemblage as in claim 5 which includes a pump with a connector couplable to the electrical socket.

7. An assemblage as in claim 1 wherein the cable carries therein an elongated vent tube which extends from within the housing to the first end.

8. An assemblage as in claim 1 where the connector includes both an AC socket portion and an AC plug portion.

9. An assemblage as in claim 8 which includes control circuits carried on the ring, in the housing, the circuits are coupled to the second end to provide a switched electrical path between the socket portion and the plug portion in response to signals from the transducer.

10. An assemblage as in claim 7 wherein the transducer structure includes a strain gauge carried on an elongated metal plate wherein one end of the metal plate is attached to the radial member of the ring, and the pressure plate is carried by a second end of the metal plate.

11. An assemblage as in claim 7 which includes a pump, separately movable relative to the housing, and with the pump electrically connected to the housing outside of the housing.

* * * * *